US012195112B2

(12) United States Patent
Pantaleo et al.

(10) Patent No.: US 12,195,112 B2
(45) Date of Patent: Jan. 14, 2025

(54) RECONFIGURABLE WHEEL-TRACK ASSEMBLY WITH HALF-MOON CONFIGURATION

(71) Applicant: CARNEGIE MELLON UNIVERSITY, Pittsburgh, PA (US)

(72) Inventors: Richard Pantaleo, Pittsburgh, PA (US); Dimitrios Apostolopoulos, Pittsburgh, PA (US); Edward Mutschler, Pittsburgh, PA (US); Matthew Glisson, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 601 days.

(21) Appl. No.: 17/433,901

(22) PCT Filed: Apr. 29, 2020

(86) PCT No.: PCT/US2020/030404
§ 371 (c)(1),
(2) Date: Aug. 25, 2021

(87) PCT Pub. No.: WO2020/223305
PCT Pub. Date: Nov. 5, 2020

(65) Prior Publication Data
US 2022/0169324 A1 Jun. 2, 2022

Related U.S. Application Data

(60) Provisional application No. 62/840,217, filed on Apr. 29, 2019.

(51) Int. Cl.
*B62D 55/04* (2006.01)
*B60B 19/02* (2006.01)
(Continued)

(52) U.S. Cl.
CPC .............. *B62D 55/04* (2013.01); *B60B 19/02* (2013.01); *B62D 55/084* (2013.01); *B62D 55/125* (2013.01); *B62D 55/14* (2013.01)

(58) Field of Classification Search
CPC ........ B62D 55/04; B62D 55/10; B62D 55/12; B62D 55/14; B62D 55/125; B60B 19/02
(Continued)

(56) References Cited

U.S. PATENT DOCUMENTS 2,173,793 A * 9/1939 Doblhoff ................ B62D 55/04
180/9.3
5,492,390 A 2/1996 Kugelmann, Sr.
(Continued)

FOREIGN PATENT DOCUMENTS

| CN | 102514446 A | 6/2012 |
|----|-------------|--------|
| CN | 104443088 A | 3/2015 |

(Continued)

OTHER PUBLICATIONS

CN-105882774-A translation (Year: 2016).*
(Continued)

*Primary Examiner* — Christopher B Wehrly
(74) *Attorney, Agent, or Firm* — KDW Firm PLLC (57) ABSTRACT

The Reconfigurable Wheel-Track (RWT) is a novel mechanism that allows a wheel to transform into a track, and vice-versa. The wheel permits a vehicle to travel quickly over smooth and semi-rough terrain, then, on-the-fly, transform rapidly into a powered track for crossing extreme terrain. The reconfigurable wheel-track consists of several main components: an outer tire/tread, drive mechanisms for the wheel and track, support mechanisms for the outer tread when in either wheel mode or track mode, and a reconfiguration mechanism that facilitates the transformation from a wheel to a track and vice-versa. The reconfigurable wheel- (Continued)

track includes sensing, actuation, and controls to facilitate efficient and effective transition from wheel to track and vice-versa, and securely maintain each shape.

18 Claims, 9 Drawing Sheets

(51) Int. Cl.
  *B62D 55/084* (2006.01)
  *B62D 55/125* (2006.01)
  *B62D 55/14* (2006.01)

(58) Field of Classification Search
  USPC ....... 180/9.1, 9.21, 6.54, 6.58, 6.7; 280/5.22
  See application file for complete search history.

(56) References Cited

U.S. PATENT DOCUMENTS

| | | | |
|---|---|---|---|
| 6,422,576 | B1 | 7/2002 | Michaeli et al. |
| 9,522,708 | B2 | 12/2016 | He |
| 9,796,434 | B2 | 10/2017 | Alidan |
| 2008/0061627 | A1* | 3/2008 | Spector ................ B62D 55/305 305/180 |
| 2011/0037311 | A1 | 2/2011 | Stolkin |
| 2014/0035355 | A1 | 2/2014 | He |

FOREIGN PATENT DOCUMENTS

| | | | |
|---|---|---|---|
| CN | 105564148 | A | 5/2016 |
| CN | 105774930 | A | 7/2016 |
| CN | 105882774 | A * | 8/2016 |
| CN | 109131610 | A | 1/2019 |
| CN | 109383646 | A * | 2/2019 |
| CN | 109649075 | A | 4/2019 |
| CN | 111096113 | A | 5/2020 |
| CN | 210455005 | U | 5/2020 |
| CN | 210617739 | U | 5/2020 |
| WO | 2019025929 | A1 | 2/2019 |

OTHER PUBLICATIONS

CN-109383646-A (Year: 2019).*
International Search Report and Written Opinion for International Patent Application No. PCT/US20/30404 mailed on Aug. 3, 2020, 8 pages.
Reconfigurable Wheel Track & Extreme Travel Suspension By DARPA' (DPCcars) Jun. 24, 2018 (Jun. 24, 2018) [online] retrieved from <URL:https://www.youtube.com/watch?v=8iq0Dh0Czls> entire document, especially demonstration 0:00-0:29.
International Search Report and Written Opinion for International Patent Application No. PCT/US2020/030392 mailed on Aug. 4, 2020, 9 pages.
International Search Report and Written Opinion for International Patent Application No. PCT/US20/30395 mailed on Aug. 3, 2020, 8 pages.

* cited by examiner

FIG. 9

RECONFIGURABLE WHEEL-TRACK ASSEMBLY WITH HALF-MOON CONFIGURATION

RELATED APPLICATIONS

This application is a national phase filing under 35 U.S.C. § 371 claiming the benefit of and priority to International Patent Application No. PCT/US2020/030404, filed Apr. 29, 2020, which claims the benefit of U.S. Provisional Patent Application No. 62/840,217, filed Apr. 29, 2019, the contents of which are incorporated herein in their entirety.

GOVERNMENT RIGHTS

This invention was made with government support under contract W56HZV-16-C-0026 awarded by the DARPA. The government has certain rights in the invention.

BACKGROUND

Most wheeled vehicles are designed for efficient movement on hard road surfaces and packed dirt roads but are less efficient or struggle to operate on more extreme off-road terrains. Converting a wheeled vehicle to a tracked vehicle enables a vehicle to access more extreme terrains; however, this comes at the expense of speed, maneuverability, and efficiency of operation on hard road surfaces.

Conversion of a wheeled vehicle to a tracked vehicle is currently accomplished through commercially available track conversion kits. Conversion requires complete removal of the wheels and installation of a track unit in place of each wheel. This process can take an hour or more to complete. Track units typically limit the top speed of the vehicle to 45 miles per hour/70 kilometers per hour or less. Track units cover a breadth of scales, from small consumer-grade all-terrain vehicles with capacities of a few hundred pounds, to large agricultural equipment with capacities of many tons.

A transforming wheel/track unit would transform from wheeled mode to track mode and back without the need for replacement of the wheels with track units and vice-versa. Preferably, a transforming wheel/track unit would be able to transform between modes while the vehicle is in motion. There are currently no commercially available transforming wheel/track units. As such, it would be desirable to have a vehicle equipped with transport units that can convert on-the-fly between wheeled and track modes.

SUMMARY OF THE INVENTION

The Reconfigurable Wheel-Track (RWT) is a novel mechanism that allows a wheel to transform into a track, and vice versa. The wheel mode enables quick travel over smooth terrains, while the track mode increases surface area and allows for travel over extreme terrains. The RWT consists of several main components and systems: a tread that can assume a track shape or a wheel shape, a drive mechanism, support mechanisms, and a reconfiguration mechanism that facilitates the transitions between wheel mode and track mode.

In wheel mode, the tread is supported by a frame and moveable roller wings that form the round wheel shape. When the wheel is in the proper orientation and the device begins its transition, gravity and ground forces on the tread allows the transition from wheel mode to track mode to occur, and vice versa. The frame and a set of idler wheels, as well as a drive sprocket, maintain the track shape when the device is in track mode.

A novelty of this invention is that the mode transition of the RWT can occur on-the-fly, i.e. while the vehicle is in motion. In wheel mode, the entire RWT, including the tread and center assembly, are rotating. As the braking mechanism engages, the center assembly is brought to a stop, while the tread continues to move the vehicle at a constant speed, driven by the drive mechanism that includes a sprocket that engages the tread.

DETAILED DESCRIPTION

The reconfigurable wheel-track (RWT) is a mechanism that allows a wheel to transform into a track, and vice versa. The wheel permits a vehicle to travel quickly over smooth and semi-rough terrain, then transform rapidly into a powered track for crossing extreme terrain. The RWT consists of several main components: a tread, a drive mechanism for driving the device when in track mode, support mechanisms for the tread when in either wheel mode or track mode and a reconfiguration mechanism that facilitates the transition from a wheel to a track and vice versa.

In the wheel mode, the tread is locked in place with respect to the assembly by a braking mechanism and held rigidly around the circumference by the lower frame and the roller wings, both of which are equipped with rolling bogies around their respective outer edges. Transition to the track mode is accomplished by actuating specialized mechanisms that move component in a way that a new shape is attained. Once in the track mode, the tread is driven by a single sprocket driven by the half shaft of the vehicle. The transition between modes is accomplished on-the-fly, while the vehicle is in motion.

Disclosed herein is a configuration utilizing a single fixed drive sprocket, compared to other RWT mechanisms that use multiple adjustable position drive sprockets. There are two mechanisms which are actuated to affect the transition. Clock-hand linkages lower internal roller wings to bring the tread drive sprocket into contact with the tread. A second mechanism retracts a portion of the lower half of the wheel-tread (the "half-moon") which simultaneously deploys idler wheels by means of a linkage.

A central frame houses the main drive components, routing the input power from the vehicle half shaft. The lower frame consists of two half-moon pieces joined together and contains a lead screw drive mechanism to raise and lower the central frame with respect to the lower frame for the wheel to track transition. There are small wheel rollers around the periphery of the lower frame and the roller wings to form the wheel shape and support the tread. Large idlers also attach between the lower frame and the central frame and are deployed by relative motion between the two frames. The roller wings rotate via a worm gear drive mechanism around the center of the wheel.

Figure 1A:
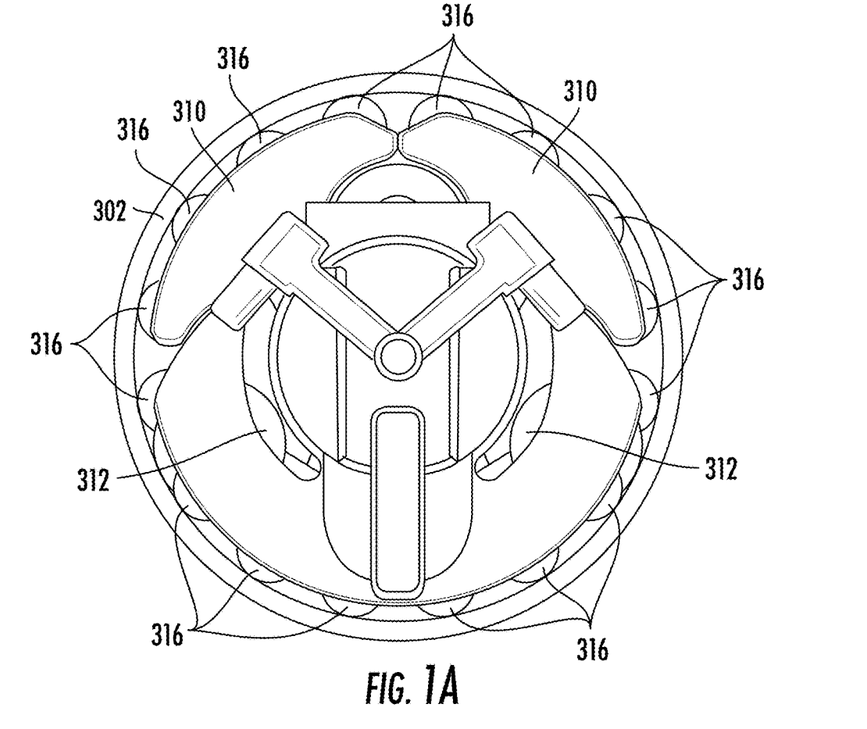
FIG. 1 shows, in View (A), a side view of the RWT in wheel mode and, in View (B), a side view of the RWT in track mode.
Figure 1B:
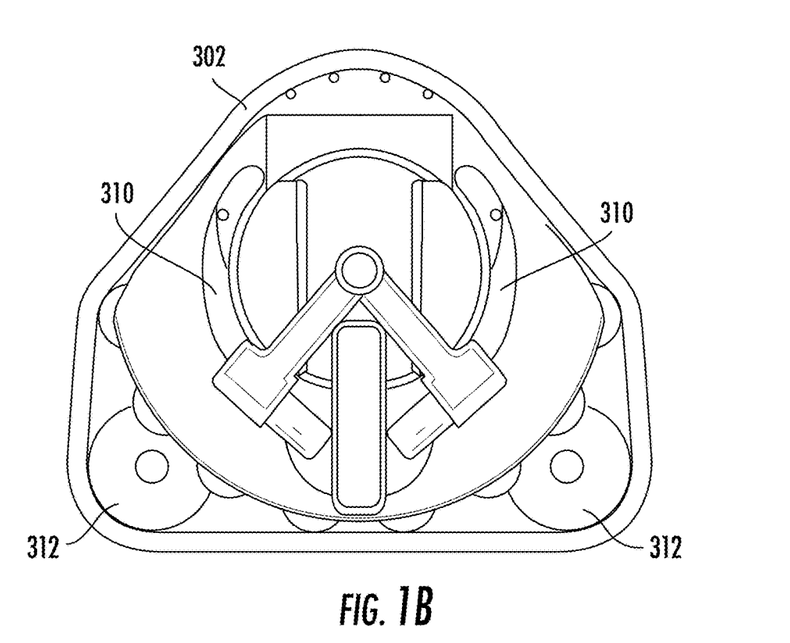
Figure 2A:
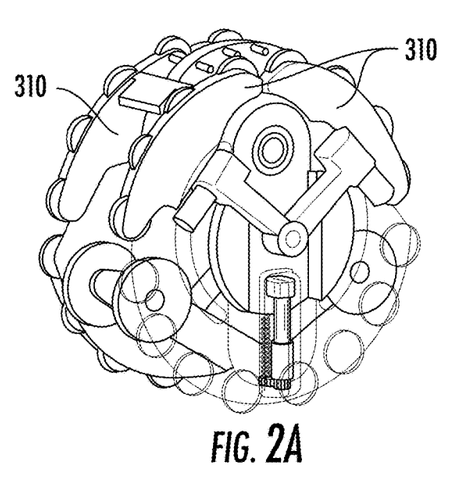
FIG. 2. shows a series of steps for transitioning the RWT from wheel mode, in View (A) to track mode, in View (D).
Figure 2B:
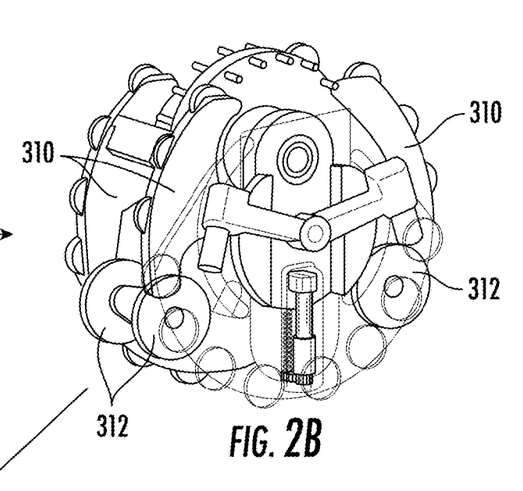
Figure 2C:
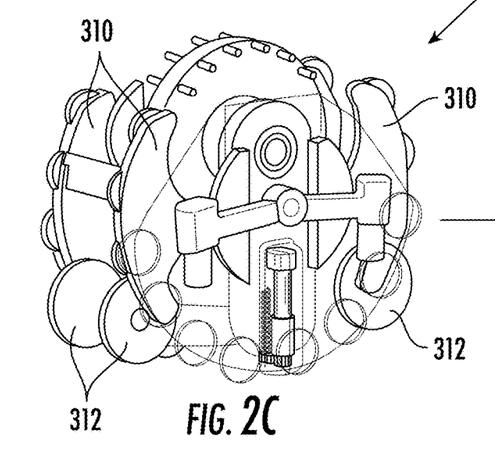
Figure 2D:
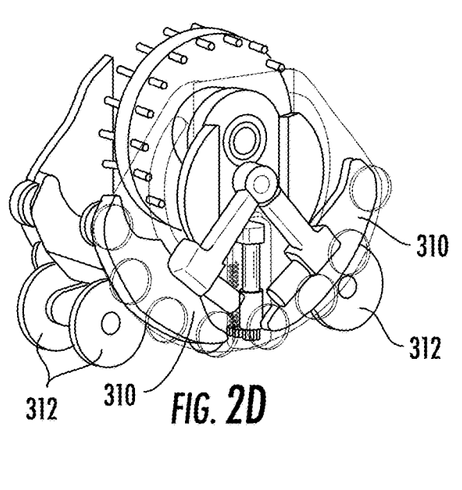

View (A) of FIG. 1 shows a side view of the assembly in wheel mode, showing the idler wheels 312 retracted into the interior of the mechanism and roller wings 310 deployed in an upward orientation to support the top of tread 302 in a circular shape. View (B) shows the assembly in track mode showing idler wheels 312 deployed to support the lower corners of the track shape and the roller wings 310 in a downward orientation allowing re-shaping of the tread 302 from a wheel shape to a track shape.

FIG. 2 shows the transition of the assembly from wheel mode, in View (A) to track mode in View (D). As can be seen, the shape-supporting roller wings 310 transition from the upward position to the downward position through the intermediate positions shown in View (B) and View (C). Likewise, idler wheels 312 transition from the retracted position through the intermediate positions shown in View (B) and View (C) to their fully deployed position, shown in View (D).

Figure 3:
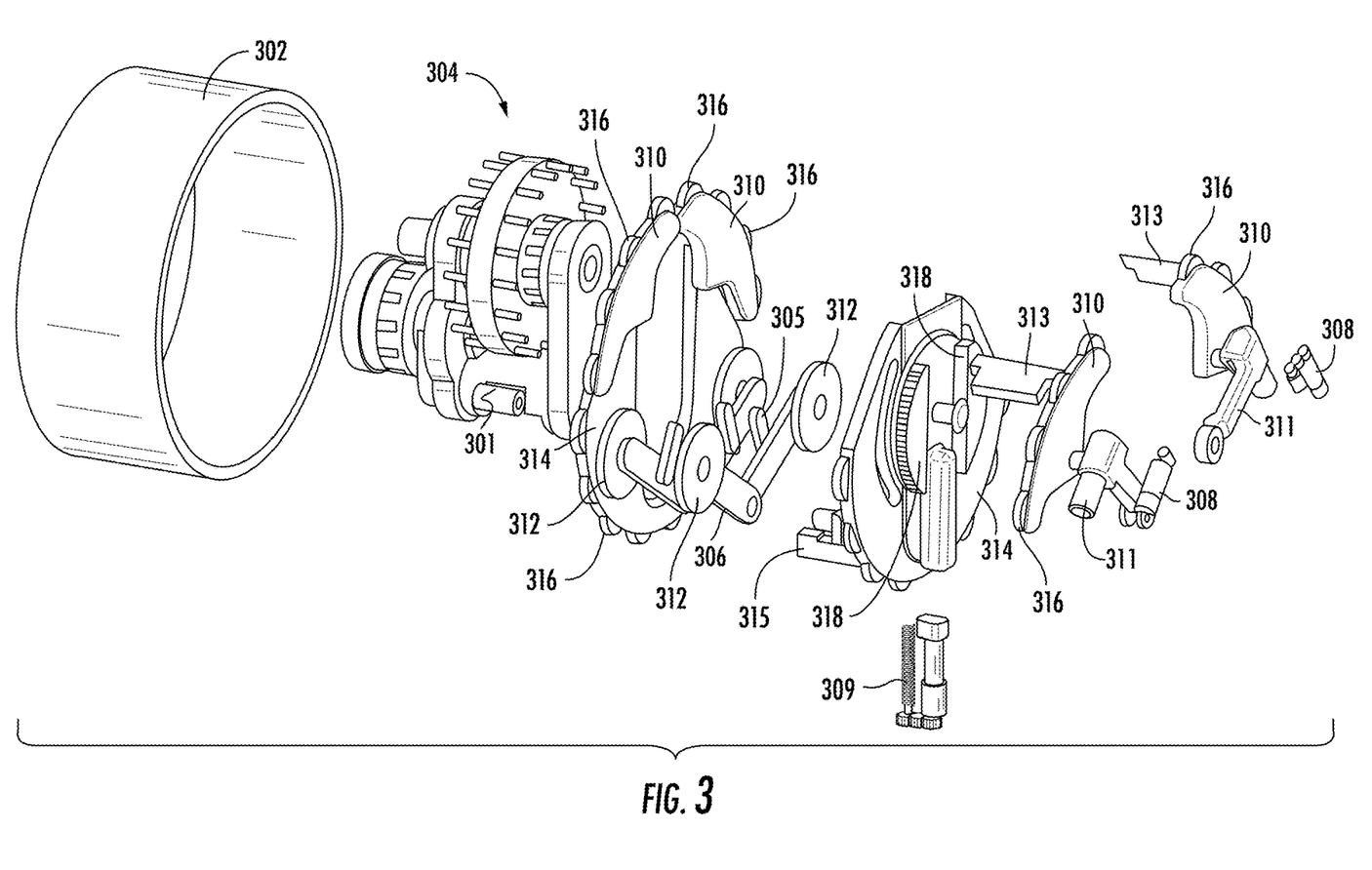
FIG. 3 is an exploded view of the mechanism for transitioning the RWT between wheel mode and track mode.

FIG. 3 shows an exploded view of the assembly. The entire assembly is housed within tread 302. The assembly consists of a drive mechanism 304, which will be explained in detail later, and a tread support and transitioning mechanism which consists of lower frame 314, roller wings 310, and idler wheels 312.

With reference to FIG. 3, in a preferred embodiment of the invention, a central frame 301 houses the main drive components, routing the input power from the vehicle half shaft. The lower frame 314 consists of two half-moon pieces joined together by connector 315. Lifting mechanism 309 moves the central frame 301 and lower frame 314 with respect to each other (closer to or farther apart from each other) for the wheel to track transitions. There are a plurality of small wheel rollers 316 disposed around the periphery to form the wheel shape and support the tread 302. Idler wheels 312 are pivotally attached to lower frame 314 and are deployed by the relative motion between central frame 301 and lower frame 314 caused by the lifting mechanism 309. Finally, there are roller wings 310 which rotate via worm gear drive mechanism 308 around the center of the wheel. Roller wings 310 have a plurality of rollers 316 disposed around the outer edge thereof to support the tread 302 in a circular shape when in wheel mode.

Figure 4:
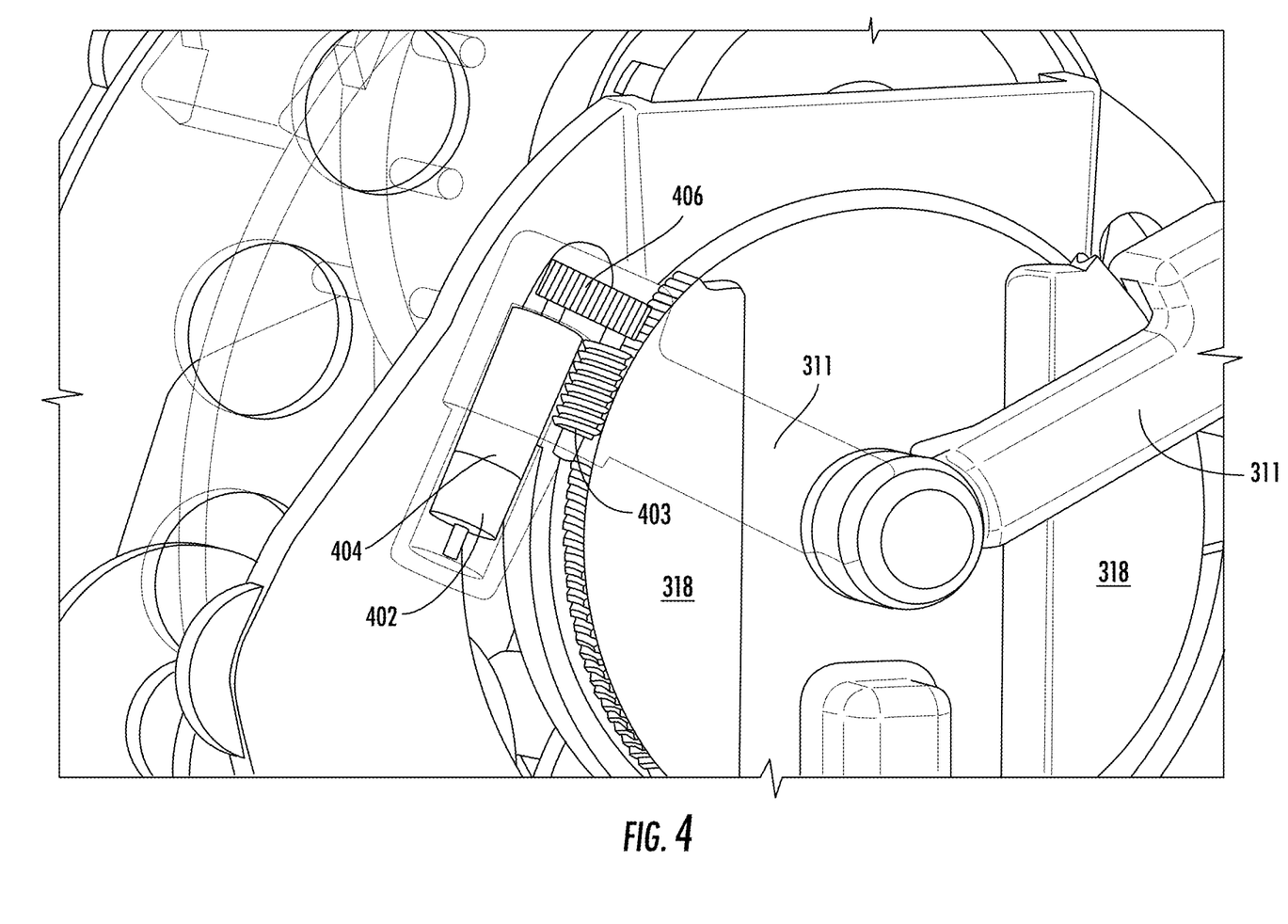
FIG. 4 is a close-up view of the mechanism for deploying the rolling wings.

FIG. 4 shows the detail of the mechanism for moving the roller wings 310 between an upward orientation and a downward orientation. Two sets of roller wings 310 are attached to clock hand linkages 311, an inner set and an outer set, one set disposed on an inner portion of tread 302 and the other disposed on an outer portion of tread 302, respectively. The inner set and outer set of roller wings 310 are connected to each other via support member 313. Clock hand linkages 311 have a portion which passes through slot 502 shown in FIG. 5 to engage one set of the roller wings 310. Clock hand linkages 311 move between the upward orientation and the downward orientation by riding along worm gear 318 driven by drive mechanism 308. Drive mechanism 308 comprises worm 403 which rides along worm gear 318. Worm 403 is driven by motor 402 via planetary gear 404 and gearing 406.

Figure 5:
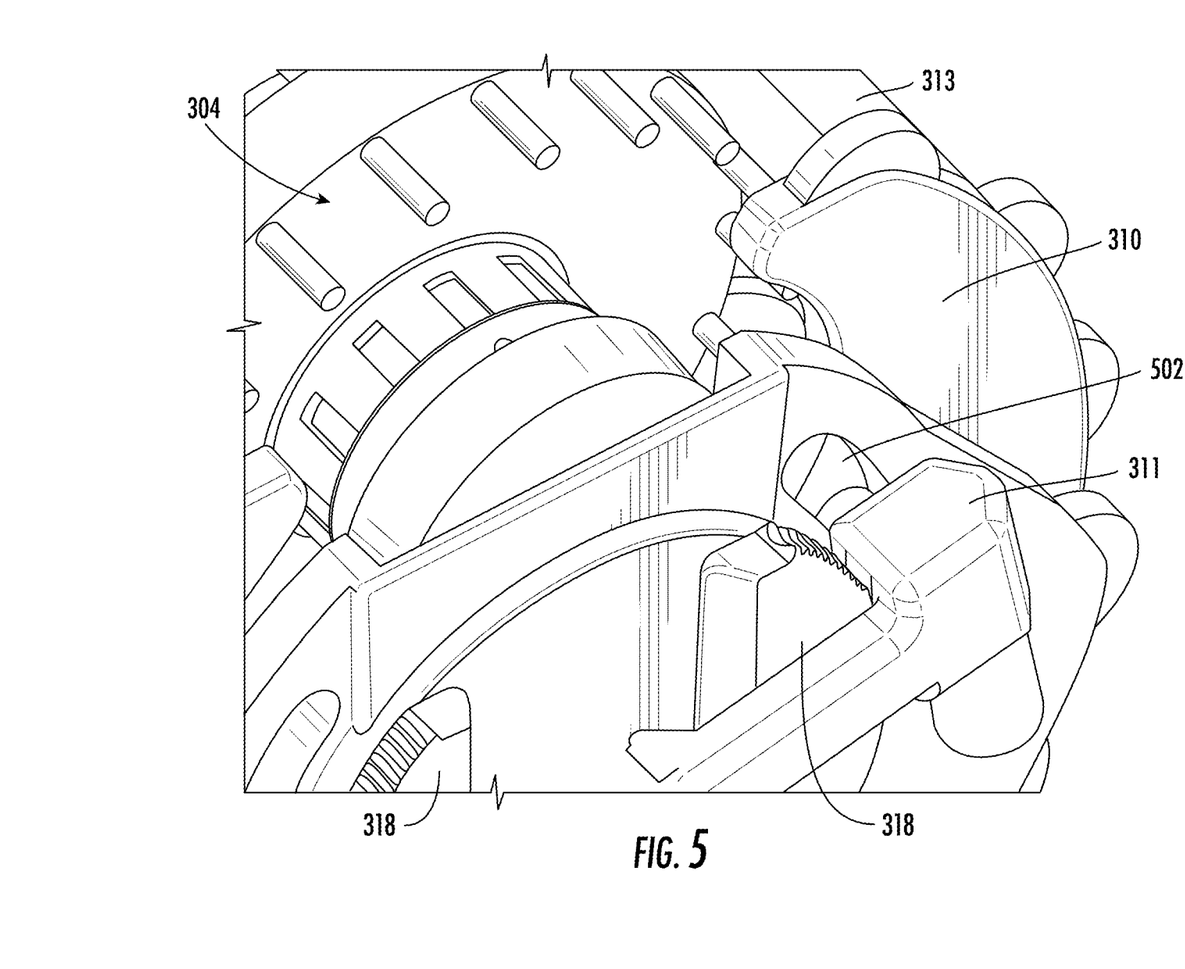
FIG. 5 is a different view of the deployment mechanism for the roller wings.

The transition between wheel mode and track mode is achieved through the use of roller wings 310 and lift mechanism 309. Roller wings 310 are attached to a central pivot by clock hand-style linkages 311. The clock hand linkages 311 and wings 310 are connected through a guide slot 502, which provides additional support and hard stops for the limits of travel of the roller wings 310. Motion of the clock hand linkages 311 is achieved by worm 403 and worm gear 318. Two sections of worm gear 318 are fixed to the lower frame 314 (one for each clock hand linkage 311). Rotation of the worm 403 by a motor 402 and gear system 404, 406 move the clock hand linkages 311.

Figure 6:
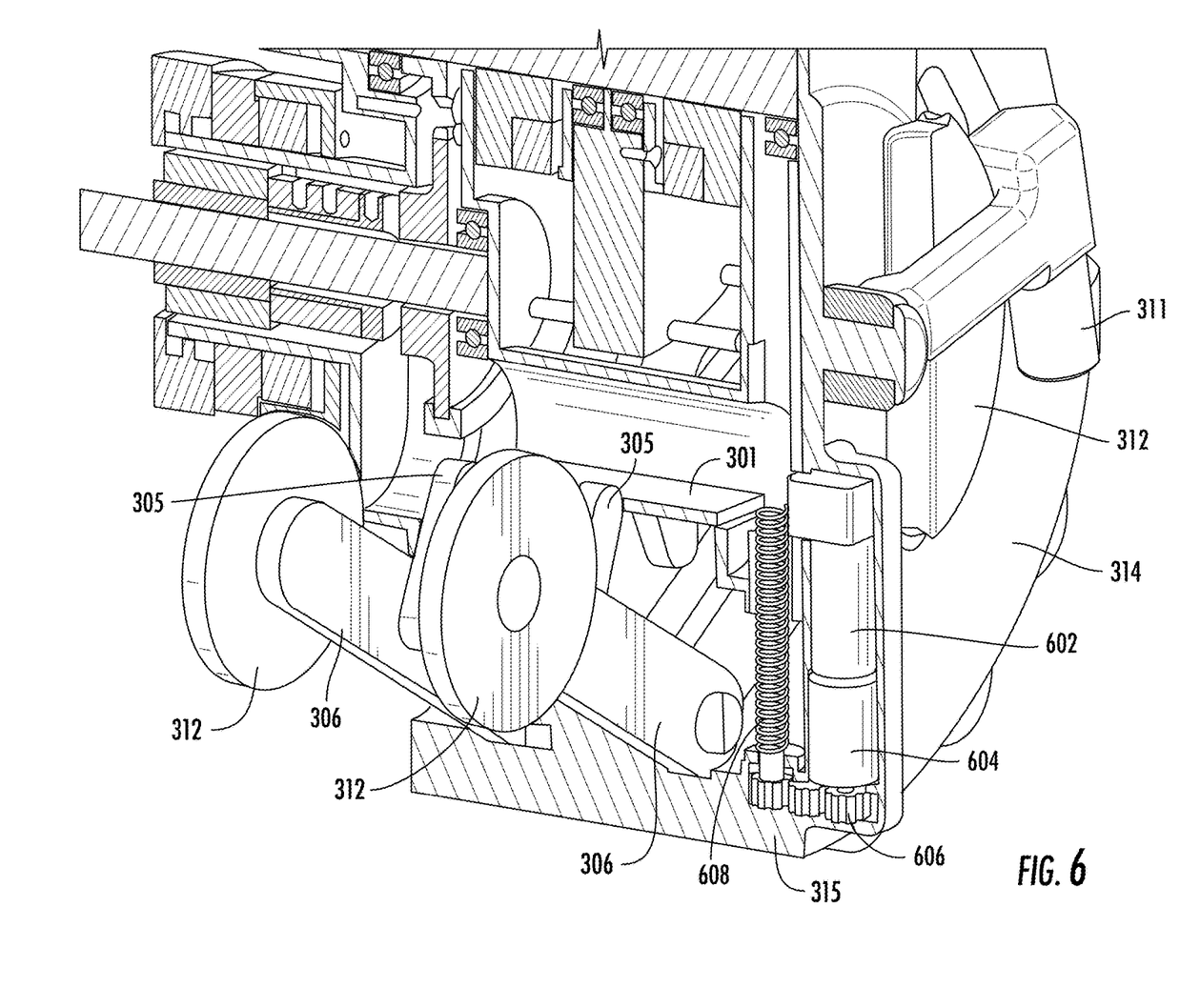
FIG. 6 shows the deployment mechanism for the idler wheels.

Lifting mechanism 309 can be seen in FIG. 6. The main component is the lead screw 608 which connects the lower frame 314 to the central frame 301. Each idler wheel 312 is pivotally connected by linkage 306 to lower frame 314. As the lead screw 608 rotates and the central frame 301 and lower frame 314 move relative to each other, they are deployed to provide tread tension and the final tread shape. The plurality of rollers 316 on the bottom of the lower frame 314 serve as bogies in track mode.

FIG. 6 shows idler wheels 312 and idler linkages 306, pivotally connected to lower frame 314. Idler linkages 305 contact central frame 301 to hold idler wheels 312 in place when in track mode. Idler wheels 312 deploy automatically as the central frame 301 is separated from lower frame 314 by lifting mechanism 309. Lifting mechanism 309 moves the central frame 301 in an upward direction with respect to lower frame 314 when in track mode such as to bring idler wheels 312 into contact with tread 302. Lifting mechanism 309 is shown in detail in FIG. 6 and consists of motor 602, which drives planetary gearbox 604 which in turn drives gearing 606. Gearing 606 is connected to the lead screw 608, which engages the assembly and may be used to raise or lower the assembly, depending on the direction of rotation. The raising of central frame 301 with respect to lower frame 314 automatically deploys idler wheels via linkages 305, 306.

Figure 7A:
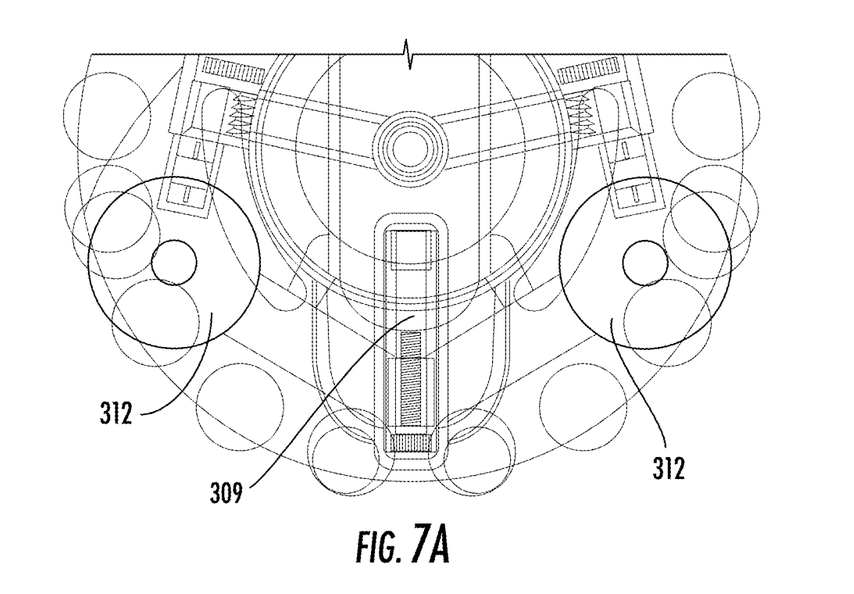
FIG. 7 is a transparent view of the RWT showing the position of the roller wings and idler wheels in wheel mode, in View (A), and in the track mode in View (B).
Figure 7B:
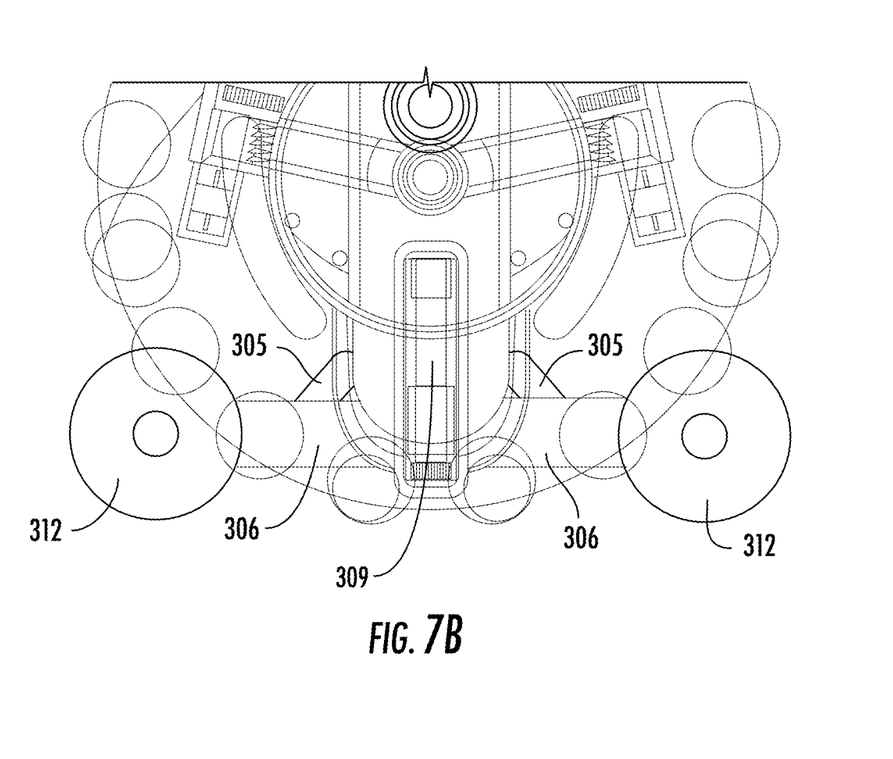

FIG. 7 shows the lifting mechanism 309 in a raised position in View (A) when the assembly is in wheel mode, and in the lowered position in View (B) when the assembly is in track mode. The lifting of the assembly when in wheel mode retracts idler wheels 312 into the interior of the assembly.

One of the challenges of the wheel-track mechanism is providing power to the tread drive sprockets. The single fixed-sprocket half-moon concept provides a simple type of power transmission. It uses a single, fixed position tread drive sprocket, illustrated by reference number 816 in FIG. 8. The sprocket has a large diameter, so it can spin at a slower rotational speed. The position of the sprocket is also fixed in the wheel/track assembly. No complicated mechanisms are needed to move the sprocket or transmit torque; simple chain drives or gears can be used. When in track mode, sprocket 816 drives tread 302. When in wheel mode, sprocket 816 is maintains contact with tread 302 and is locked to prevent rotation, thereby preventing tread 302 from rotating with respect to the assembly when in wheel mode.

Figure 8:
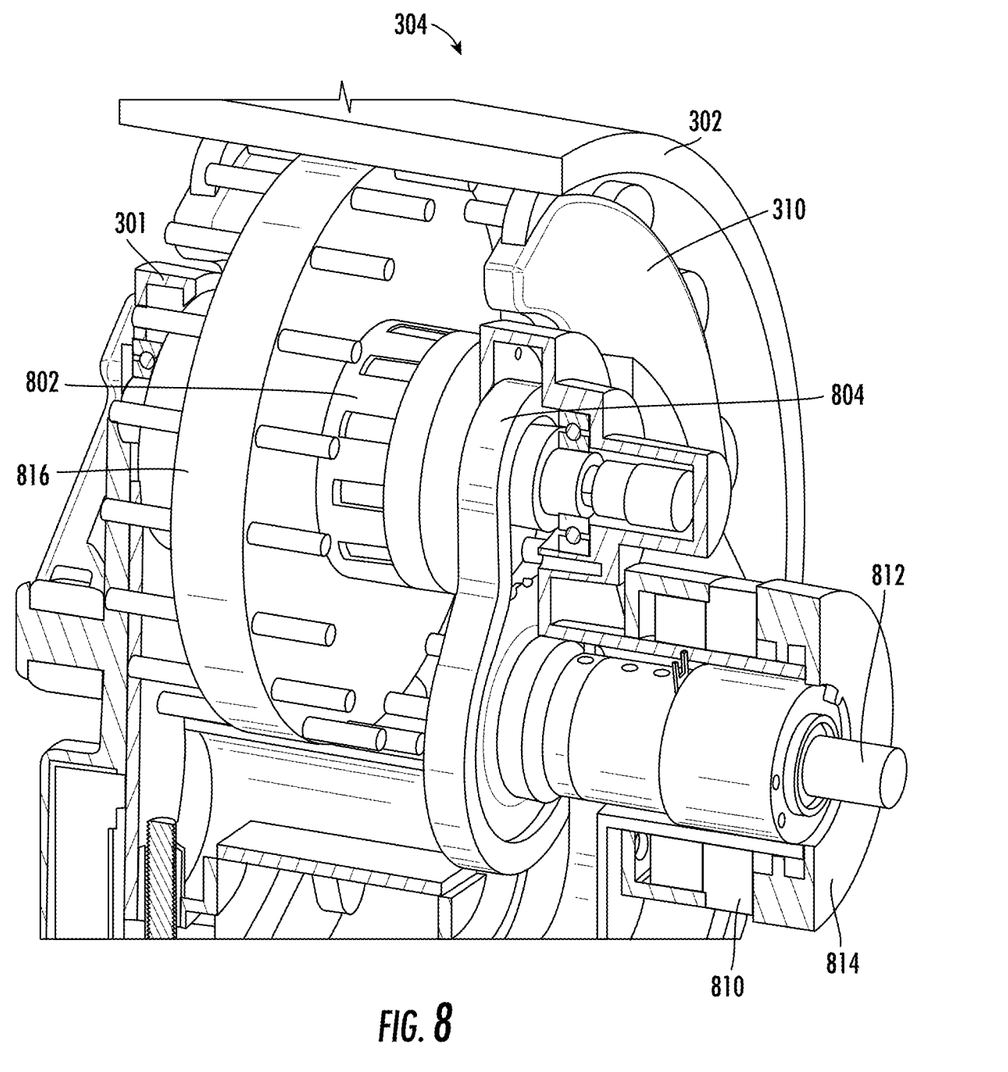
FIG. 8 is a cutaway view of the RWT showing the power transmission mechanism.
Figure 9:
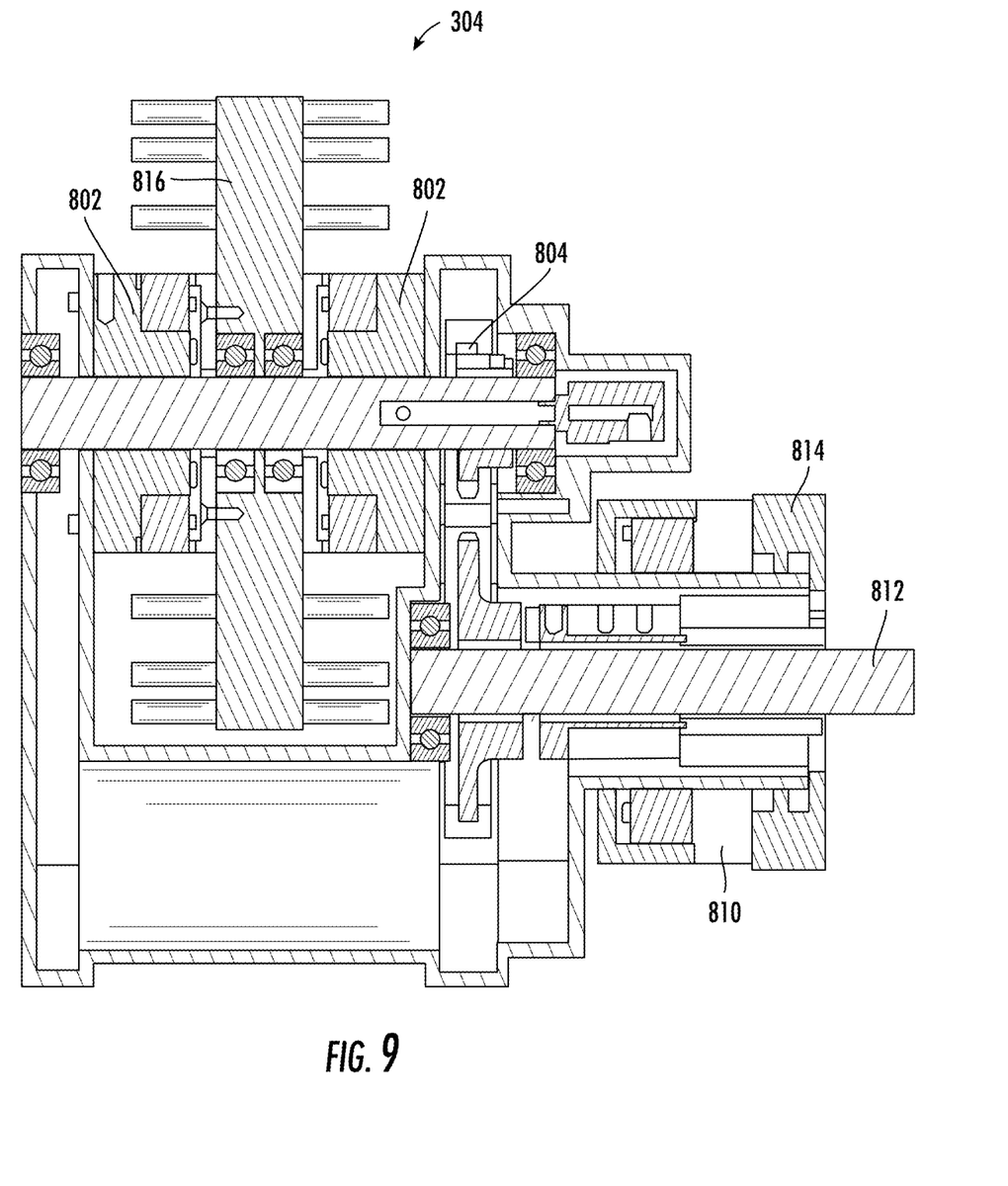
FIG. 9 is a cross-sectional view of the power transmission mechanism of FIG. 8.

With reference to FIG. 8 and FIG. 9, preferred embodiments of the invention use a combination of clutches and brakes to carry out the transition. The main shaft input 812 on the wheel is connected via a coupling to the vehicle half shaft. A mounting flange 814 with bearings attaches the wheel structure to the vehicle, allowing it to rotate independently to the input shaft. Mounted to both the flange and the central frame is the pneumatic main brake 810. Main brake 810 controls the overall rotation of the assembly, either letting it freely rotate (wheel mode), or locking it to the frame (track mode).

Input shaft 812 is connected to a chain and sprocket drive 804, which transmits the input power to the tread drive axle and provides the necessary speed ratio increase to maintain a constant vehicle stub shaft speed whether in wheel or track mode. The tread drive sprocket 816 is mounted on bearings on the axle. It is coupled to the axle via a pneumatic clutch/brake assembly 802 which connects the drive sprocket 816 to the frame 301. This dual clutch/brake arrangement allows for flexibility of power transmission during mode transition.

FIG. 8 shows drive mechanism 304. The assembly connects to the vehicle via input driveshaft 812. When in wheel mode, clutch and brake 802 at sprocket 816 are engaged and the main brake 810 is disengaged, so that the rotation of the input shaft 812 causes the entire assembly to rotate. When in track mode, main brake 810 is engaged, causing the assembly to stop rotating, while clutch/brake 802 at the sprocket 816 are disengaged, allowing sprocket 816 to rotate, driven by input shaft 812 via chain and sprocket drive 804. The assembly is connected to the vehicle suspension via flange mount 814. FIG. 9 shows the drive mechanism 304 in a cross-sectional view to better show the arrangement of the components.

To route pneumatic and electrical power from the vehicle into the assembly, rotary unions and slip rings are used. The clutch and brake assembly 802 at sprocket 816 also requires adding additional rotary union. This rotary union is attached to the sprocket drive axle, which is hollow and cross drilled to provide a route for the pneumatic power to the clutch.

As would be realized by one of skill in the art, the exact arrangements of components in the foregoing description are provided to explain the invention. Other arrangements are possible and will still be considered within the scope of the invention.

The invention claimed is:

1. A reconfigurable wheel-track device for a vehicle, comprising:
   a tread; and an assembly comprising: a central frame; a drive mechanism coupled to the central frame; a lower frame, coupled to the central frame; a plurality of roller wings supported by the lower frame;
   a plurality of idler wheels pivotally connected via a plurality of idler wheel linkages to the lower frame; and
   a lifting mechanism, coupled between the central frame the lower frame, for moving the central frame and the lower frame with respect to each other wherein the wheel-track device switches between wheel mode and track mode when the vehicle is in motion.

2. The device of claim 1, the lifting mechanism comprising:
   a motor, connected to the lower frame;
   gearing, driven by the motor; and
   a lead screw, driven by the gearing and coupled to the central frame.

3. The device of claim 2, the central frame being raised with respect to the lower frame during transition from the track mode to the wheel mode and lowered with respect to the lower frame during transition from the wheel mode to the track mode.

4. The device of claim 1, wherein when the central frame is raised with respect to lower frame by the lifting mechanism, the plurality of idler wheels are moved from a retracted position in the wheel mode to a deployed position in contact with the tread in the track mode.

5. The device of claim 1, the plurality of roller wings being deployed in an upward orientation when in the wheel mode and in the downward orientation when in the track mode.

6. The device of claim 5, further comprising:
   a plurality of clock hand linkages rotatably connecting the roller wings to the lower frame; and
   a plurality of drive mechanisms for rotating the clock hand linkages, each drive mechanism comprising:
   a worm gear;
   a worm; and
   a motor, linked to the worm.

7. The device of claim 5, further comprising: a plurality of rollers disposed on an outer edge of each rolling wing, the rollers rotating freely with respect to the roller wings; wherein the plurality of rollers contact the tread when in the wheel mode.

8. The device of claim 1, further comprising: a plurality of rollers disposed on an outer edge of the lower frame, the rollers rotating freely with respect to the lower frame; wherein the plurality of rollers contact the tread when in the wheel mode; and wherein a portion of the rollers contact the tread when in the track mode.

9. The device of claim 1, the drive mechanism further comprising:
   an input shaft for coupling to half shaft of the vehicle;
   a main brake disposed between the input shaft and the central frame;
   a sprocket;
   a chain-link mechanism coupling the sprocket to the input shaft; and
   a sprocket clutch/brake mechanism disposed between the sprocket and the central frame.

10. The device of claim 9, the main brake being engaged when the device is in the track mode, the main brake preventing the assembly from rotating with the input shaft.

11. The device of claim 9, the main brake being disengaged when the device is in the wheel mode, thereby allowing the assembly to rotate with the input shaft.

12. The device of claim 9, the sprocket clutch/brake mechanism being engaged when the device is in the wheel mode, the sprocket clutch/brake mechanism preventing the sprocket from rotating.

13. The device of claim 9, the sprocket clutch/brake mechanism being disengaged when the device is in the track mode, thereby allowing the sprocket to be driven by the input shaft via the chain-link mechanism.

14. The device of claim 9, the sprocket engaging the tread when the device is in the track mode and disengaging from the treat when the device is in the wheel mode.

15. A method of transitioning the device of claim 1, from the wheel mode to the track mode comprising:
   engaging a main brake to slow the rotation of the assembly;
   transitioning the plurality of roller wings from the wheel mode to the track mode;
   engaging the lifting mechanism to raise the central frame with respect to the lower frame, resulting in deployment of the plurality of idler wheels; and
   disengaging a sprocket clutch/brake mechanism to allow a sprocket to be driven by an input shaft connected to a half shaft of the vehicle.

16. The method of claim 15 wherein, when in the track mode, the assembly is not rotating.

17. A method of transitioning the device of claim 1, from the track mode to the wheel mode comprising:
  transitioning the plurality of roller wings from the track mode to the wheel mode;
  engaging a sprocket clutch/brake mechanism to stop rotation of a sprocket;
  engaging the lifting mechanism to lower the central frame with respect to the lower frame, resulting in retracting of the plurality of idler wheels into the assembly; and
  disengaging a main brake mechanism to allow the assembly to be to be driven by an input shaft connected to a half shaft of the vehicle.

18. The method of claim 17 wherein, when in the wheel mode, the tread and the assembly rotate as a unit.

* * * * *

UNITED STATES PATENT AND TRADEMARK OFFICE
CERTIFICATE OF CORRECTION

| | | |
|---|---|---|
| PATENT NO. | : 12,195,112 B2 | Page 1 of 1 |
| APPLICATION NO. | : 17/433901 | |
| DATED | : January 14, 2025 | |
| INVENTOR(S) | : Richard Pantaleo et al. | |

It is certified that error appears in the above-identified patent and that said Letters Patent is hereby corrected as shown below:

In the Claims

In Column 5, Claim 4, Line 66, "...idler wheels arc..." should read "...idler wheels are..."

In Column 6, Claim 14, Line 53, "...the treat when..." should read "...the tread when..."

Signed and Sealed this
Sixth Day of May, 2025

Coke Morgan Stewart
*Acting Director of the United States Patent and Trademark Office*